US009590448B2

(12) United States Patent
Wang et al.

(10) Patent No.: US 9,590,448 B2
(45) Date of Patent: Mar. 7, 2017

(54) POWER TRANSMITTING APPARATUS, POWER RECEIVING APPARATUS, AND METHODS THEREOF

(71) Applicant: HYUAS COMMUNICATION INC., Seoul (KR)

(72) Inventors: Jee Hyun Wang, Seoul (KR); Seung Jae Paik, Seoul (KR); Seung Yoon Paik, Seoul (KR)

(73) Assignees: HYUAS COMMUNICATION INC. (KR); Jee Hyun Wang (KR)

( * ) Notice: Subject to any disclaimer, the term of this patent is extended or adjusted under 35 U.S.C. 154(b) by 0 days.

(21) Appl. No.: 14/764,364

(22) PCT Filed: Jan. 21, 2014

(86) PCT No.: PCT/KR2014/000591
§ 371 (c)(1),
(2) Date: Jul. 29, 2015

(87) PCT Pub. No.: WO2014/119866
PCT Pub. Date: Aug. 7, 2014

(65) Prior Publication Data
US 2015/0364946 A1    Dec. 17, 2015

(30) Foreign Application Priority Data

Jan. 31, 2013   (KR) ........................ 10-2013-0011393

(51) Int. Cl.
*H02J 7/02* (2016.01)
*H02J 7/04* (2006.01)
(Continued)

(52) U.S. Cl.
CPC ............ *H02J 7/025* (2013.01); *H02J 7/0047* (2013.01); *H02J 7/0054* (2013.01); *H02J 7/04* (2013.01);
(Continued)

(58) Field of Classification Search
CPC ...................................................... H02J 7/025
See application file for complete search history.

(56) References Cited

U.S. PATENT DOCUMENTS 8,473,250 B2 *   6/2013   Adest .............................. 307/56
2007/0183392 A1 *   8/2007   Tandai ................ H04W 52/245
370/350
(Continued)

FOREIGN PATENT DOCUMENTS

CN        101499669        8/2009
JP        2005168085       6/2005
(Continued)

OTHER PUBLICATIONS

International Search Report dated May 29, 2014 issued in International Application No. PCT/KR2014/000591.
(Continued)

*Primary Examiner* — Tuan H Nguyen
(74) *Attorney, Agent, or Firm* — Onello & Mello, LLP

(57) ABSTRACT

A power transmitting apparatus, a power receiving apparatus, and methods thereof are provided, which can make a certain amount of power, that is set by the transmitting apparatus or the receiving apparatus, be transmitted and received in transmitting and receiving the power by wire or wirelessly between the apparatuses. The power transmitting apparatus includes a power transmitting unit configured to transmit power of a provided battery to a power receiving apparatus; a confirmation unit configured to confirm at least one of a residual amount of the battery, a transmitted amount of the power, an amount of power that is received by the power receiving apparatus, a charge amount of the power receiving apparatus, and an accumulated time for which the power is being transmitted; and a control unit configured to control transmission of the power through comparison of the
(Continued)

result of the confirmation with a predetermined threshold value.

12 Claims, 7 Drawing Sheets

(51) Int. Cl.
    *H02J 7/00*         (2006.01)
    *H04W 52/02*       (2009.01)

(52) U.S. Cl.
    CPC .............. *H02J 50/10* (2016.02); *H02J 50/80* (2016.02); *H04W 52/0225* (2013.01); *Y02B 60/50* (2013.01)

(56) References Cited

U.S. PATENT DOCUMENTS

2013/0002191 A1     1/2013   Jung et al.
2014/0117921 A1*   5/2014   Suomela .............. H04B 5/0031
                                                  320/103

FOREIGN PATENT DOCUMENTS

| | | |
|---|---|---|
| JP | 2006287555 | 10/2006 |
| JP | 2010028915 | 2/2010 |
| KR | 2011103368 | 9/2011 |
| WO | 2011112064 | 9/2011 |

OTHER PUBLICATIONS

NOA issued in KR1020130011393.
Chinese Office Action dated Nov. 2, 2016 issued in corresponding Chinese Application No. 201480006933.X.

* cited by examiner

POWER TRANSMITTING APPARATUS

POWER RECEIVING APPARATUS

POWER TRANSMITTING APPARATUS, POWER RECEIVING APPARATUS, AND METHODS THEREOF

TECHNICAL FIELD

The present invention relates to a power transmitting apparatus, a power receiving apparatus, and methods thereof, and more particularly to a power transmitting apparatus, a power receiving apparatus, and methods thereof, which can make a certain amount of power, that is set by the transmitting apparatus or the receiving apparatus, be transmitted and received in transmitting and receiving the power by wire or wirelessly between the apparatuses.

BACKGROUND ART

Recently, with the rapid progress of electronic engineering and communication engineering, mobile communication terminals currently have various functions. That is, as wireless communication and data processing technology has been developed at high speed, users can use not only a voice call function but also functions of Internet connection, video communication, and moving image message transmission using mobile communication terminals.

Further, with the abrupt spread of mobile communication terminals, a considerable amount of communication that occurs in human relations has been performed through the mobile communication terminals. Consequently, mobile communication terminals have settled down as essential communication means in modern life.

A mobile communication terminal is supplied with power through a battery attached thereto according to the characteristic thereof. In general, a battery for charging is used, and a user should charge the battery at any time so that the terminal can operate normally.

According to the recent mobile communication terminal, a specific amount of power has been set to protect an internal circuit and to lengthen the lifespan of the battery, and if the amount of power that is supplied becomes smaller than the set amount of power, power supply to an internal circuit is intercepted.

If the power supply is intercepted as described above, a user is unable to operate the mobile communication terminal any more, and what is worse, even an emergency call may not be performed.

In order to solve this problem, mobile communication service providers or some private service providers are provided with places or devices for charging mobile communication terminals. However, in the case where a user who is moving by bus or subway intends to emergently charge his/her own terminal, he/she is unable to use such facilities.

Accordingly, there has been a need for the appearance of an invention that enables a moving user to charge his/her own mobile communication terminal.

DISCLOSURE

Technical Problem

Accordingly, the present invention has been made to solve the above-mentioned problems occurring in the related art, and a subject to be achieved by the present invention is to make a certain amount of power, that is set by a transmitting apparatus or a receiving apparatus, be transmitted and received in transmitting and receiving the power by wire or wirelessly between the apparatuses.

Additional advantages, subjects, and features of the invention will be set forth in part in the description which follows and in part will become apparent to those having ordinary skill in the art upon examination of the following or may be learned from practice of the invention.

Technical Solution

In one aspect of the present invention, there is provided a power transmitting apparatus, which includes a power transmitting unit configured to transmit power of a provided battery to a power receiving apparatus; a confirmation unit configured to confirm at least one of a residual amount of the battery, a transmitted amount of the power, an amount of power that is received by the power receiving apparatus, a charge amount of the power receiving apparatus, and an accumulated time for which the power is being transmitted; and a control unit configured to control transmission of the power through comparison of the result of the confirmation with a predetermined threshold value.

In another aspect of the present invention, there is provided a power receiving apparatus, which includes a power receiving unit configured to receive power from a power transmitting apparatus and charging a battery provided therein; a confirmation unit configured to confirm at least one of a residual amount of the battery, a received amount of the power, an amount of power that is transmitted by the power transmitting apparatus, a residual amount of a battery of the power transmitting apparatus, and an accumulated time for which the power is being received; and a control unit configured to control reception of the power through comparison of the result of the confirmation with a predetermined threshold value.

In still another aspect of the present invention, there is provided a power transmitting method, which includes transmitting power of a provided battery to a power receiving apparatus; continuing at least one of a residual amount of the battery, a transmitted amount of the power, an amount of power that is received by the power receiving apparatus, a charge amount of the power receiving apparatus, and an accumulated time for which the power is being transmitted; and controlling transmission of the power through comparison of the result of the confirmation with a predetermined threshold value.

In yet still another aspect of the present invention, there is provided a power receiving method, which includes receiving power from a power transmitting apparatus; charging a provided battery with the received power; confirming at least one of a residual amount of the battery, a received amount of the power, an amount of power that is transmitted by the power transmitting apparatus, a residual amount of a battery of the power transmitting apparatus, and an accumulated time for which the power is being received; and controlling reception of the power through comparison of the result of the confirmation with a predetermined threshold value.

Detailed items of other embodiments are included in the detailed description and drawings.

Advantageous Effects

According to the power transmitting apparatus, the power receiving apparatus, and the methods thereof according to embodiments of the present invention, since a certain amount of power, that is set by the transmitting apparatus or the receiving apparatus, can be transmitted and received in transmitting and receiving the power by wire or wirelessly between the apparatuses, a user of the transmitting apparatus or the receiving apparatus can make the power be transmitted and received as much as an amount of power that the user desires.

The effects of the present invention are not limited to the above-described effects, and other unmentioned effects will be clearly understood to those skilled in the art from the description of claims.

DESCRIPTION OF DRAWINGS

The above and other subjects, features and advantages of the present invention will be more apparent from the following detailed description taken in conjunction with the accompanying drawings, in which.

BEST MODE FOR INVENTION

Figure 1:
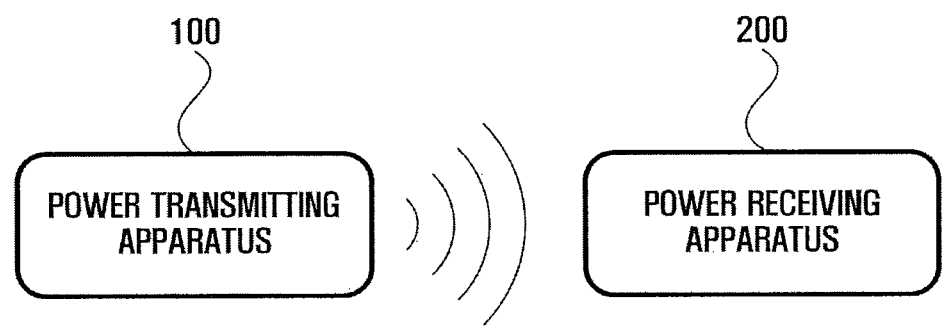
FIG. 1 is a diagram illustrating a power transmitting apparatus and a power receiving apparatus according to an embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the drawings, sizes and relative sizes of layers and areas may be exaggerated for clarity in explanation. In the entire description of the present invention, the same drawing reference numerals are used for the same elements across various figures.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

FIG. 1 is a diagram illustrating a power transmitting apparatus and a power receiving apparatus according to an embodiment of the present invention.

If a battery of a portable terminal is discharged or only a small amount of power remains in the battery in the case where a user who carries the portable terminal, such as a portable phone or a smart phone, is moving using public transportation, the use of the terminal may be restricted. To solve this problem, a power transmitting apparatus and a power receiving apparatus according to an embodiment of the present invention can transmit and receive power with each other.

FIG. 1 illustrates that a power transmitting apparatus 100 supplies power to a power receiving apparatus 200 that intends to receive the power.

As illustrated in FIG. 1, the power transmitting apparatus 100 can wirelessly transmit the power. That is, the power transmitting apparatus 100 may generate a magnetic field by AC electricity using an induction coil, and the power receiving apparatus 200 that is located in a region of the generated magnetic field may generate electric energy using the corresponding magnetic field and charge a battery provided therein using the generated electric energy.

However, power transmission between the power transmitting apparatus and the power receiving apparatus according to the present invention is not limited to such wireless power transmission, but may also be implemented by wire. In particular, if the power transmitting apparatus 100 or the power receiving apparatus 200 is a battery itself to be described later, it is preferable to transmit and receive the power by wire. However, if the power transmitting apparatus 100 or the power receiving apparatus 200 is provided with a battery and a power transmitting means (or power receiving means), the power can be transmitted and received wirelessly.

The power transmitting apparatus 100 and the power receiving apparatus 200 according to an embodiment of the present invention may determine the amount of power that is transmitted or received. That is, the power transmitting apparatus 100 may transmit only a predetermined amount of power to the power receiving apparatus 200, and for example, a user of the power transmitting apparatus 100 may determine that the power is transmitted in a specific ratio of a residual amount of the battery.

If a specific amount of power is determined on the side of the power transmitting apparatus 100, the power transmission by the power transmitting apparatus 100 is interrupted after the power is transmitted as much as the corresponding amount of power.

Further, the amount of power may also be determined on the side of the power receiving apparatus 200, and in this case, the power reception by the power receiving apparatus 200 may be interrupted after the power is received as much as the corresponding amount of power.

On the other hand, it is preferable that the power transmitting apparatus 100 and the power receiving apparatus 200 interrupt the power transmission and reception after the power is transmitted or received as much as the amount of power that an opposite party has requested.

In other words, if a specific amount of power is requested by the power receiving apparatus 200, not only the power receiving apparatus 200 but also the power transmitting apparatus 100 should interrupt the power supply after the power supply as much as the requested amount of power is completed. If the power supply by the power transmitting apparatus 100 is not interrupted, but only the power reception by the power receiving apparatus 200 is interrupted, the power of the power transmitting apparatus 100 is unnecessarily wasted.

For this, the power transmitting apparatus 100 and the power receiving apparatus 200 according to an embodiment of the present invention may perform data communication with each other to transmit and receive overall information on the power transmission and reception in addition to the power transmission and reception. That is, if power transmission and reception software that is installed in the respective apparatuses is operated, the corresponding software to transmit and receive data that includes information to be mutually notified.

Accordingly, if the specific amount of power is set by the power receiving apparatus 200 and the reception of the corresponding amount of power is completed, the power receiving apparatus 200 may notify the power transmitting apparatus 100 of the completion of the power reception, and the power transmitting apparatus 100 that is notified may interrupt the power supply.

The data that is transmitted and received between the power transmitting apparatus 100 and the power receiving apparatus 200 may be implemented in the form of a message, and this message may include a request message, a response message, and an information message.

The request message means a message for requesting power transmission or reception from an opposite apparatus. For example, the power transmitting apparatus 100 may transmit a power reception request message for requesting power reception to the power receiving apparatus 200, and the power receiving apparatus 200 may transmit a power transmission request message for requesting power transmission to the power transmitting apparatus 100.

The power receiving apparatus 200, that has received the power reception request message, forms a circuitry so that a power receiving means that is provided for the power reception receives the power and the received power is transferred to the battery.

Further, the power transmitting apparatus 100, that has received the power transmission request message, forms a circuitry so that the battery is connected as a power transmitting means for the power transmission and the power transmitting means transmits the power.

On the other hand, in the power transmission request message and the power reception request message according to an embodiment of the present invention, the amount of power to be transmitted and received by the respective apparatuses may be specified. That is, a constant value for a base unit of power transmission may be specified in the power transmission request message, and the base unit may include percentage, watts per hour (Wh), or time.

In the case where the base unit is percentage, it means a ratio of a transmission target to the residual amount of the battery that is provided in the power transmitting apparatus 100. For example, if a value "40" is specified in the power transmission request message, it may be understood that 40% of the power of the residual amount of the battery is scheduled to be transmitted.

The base unit may be watts per hour (Wh). For example, if a value "4" is specified in the power transmission request message, it may be understood that the power as much as 4 watts is scheduled to be transmitted.

The base unit may be time (hour, minute, or second). For example, if a value "2" is specified in the power transmission request message, it may be understood that the power is scheduled to be transmitted for two minutes.

Although the percentage, watts per hour, and time have been described as the base units, the base units according to an embodiment of the present invention are not limited thereto. Various units may be used as the base units according to the present invention, and their meanings may also be modified. For example, in the case where the base unit is percentage and a value "30" is specified in the power transmission request message, it may be understood that the power is scheduled to be transmitted until the residual amount of the battery of the power receiving apparatus 200 becomes 30%.

The base unit and a power transmission scheduled value (or power reception request value) may be specified in the power transmission request message or the power reception request message. In the case where the base unit is predetermined, only the power transmission scheduled value or the power reception request value may be specified in the power transmission request message or the power reception request message.

The response message may be used for the purpose of notifying of whether the request message has normally been transferred. Further, a notification message for notifying that the power transmission or reception starts or power transmission or reception is completed may be transmitted and received between the power transmitting apparatus 100 and the power receiving apparatus 200, and the response message may be used for the purpose of notifying whether the notification message has normally been transferred.

Further, the request message may include the information request message for requesting information, and it may be understood that the information request message is a message for requesting the above-described information message. However, the information message is to notify the other apparatus of information on the power state of the respective apparatuses, and thus may be automatically transmitted and received even without transmission and reception of the request message.

The information message may include at least one of the residual amount of the battery provided in the corresponding apparatus, the amount of power that is transmitted or received through the corresponding apparatus, and the charge amount of the battery provided in the corresponding apparatus. Using the information message, the power transmitting apparatus 100 and the power receiving apparatus 200 can perform various operations related to the power transmission and reception according to a user's request.

On the other hand, the power transmitting apparatus 100 or the power receiving apparatus 200 according to the present invention may be the battery itself. For example, the power transmitting apparatus 100 in the form of a portable terminal may transmit the power to the power receiving apparatus 200 in the form of a battery, and the power receiving apparatus 200 in the form of a portable terminal may receive the power from the power transmitting apparatus 100 in the form of a battery.

The power transmitting apparatus 100 or the power receiving apparatus 200 that can receive an input of a user command, such as a portable terminal, may supply or receive the power to or from the battery that is the opposite apparatus as much as the amount of power according to the user's request.

If the power transmitting apparatus 100 or the power receiving apparatus 200 is the battery itself, it is preferable that the power transfer between the power transmitting apparatus 100 and the power receiving apparatus 200 is implemented by wire.

Hereinafter, explanation will be made around the power transmitting apparatus 100 and the power receiving apparatus 200 in the form of a portable terminal. However, the form of the apparatuses is not limited thereto, and it is to be noted that one of them may be implemented in the form of a battery.

Figure 2:
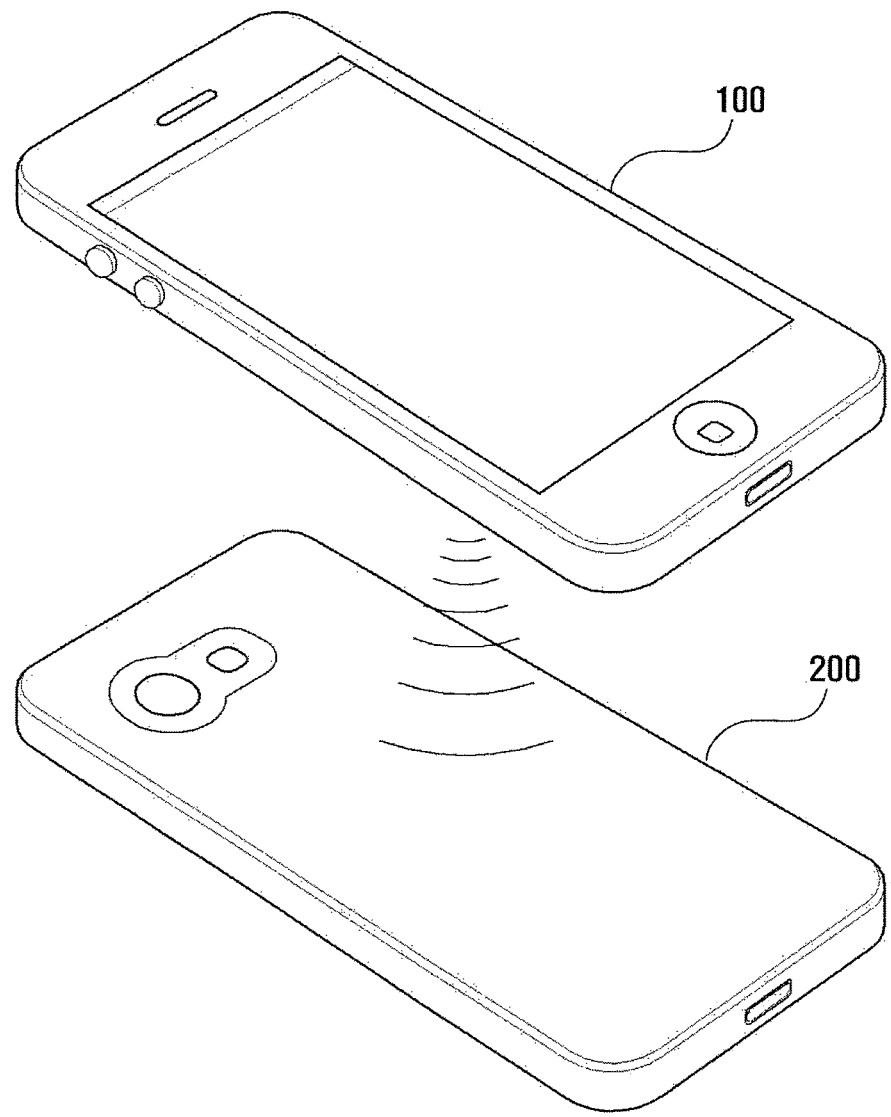
FIG. 2 is a view illustrating that power is transferred from a power transmitting apparatus to a power receiving apparatus according to an embodiment of the present invention.

FIG. 2 is a view illustrating that power is transferred from a power transmitting apparatus to a power receiving apparatus according to an embodiment of the present invention. FIG. 2 illustrates that rear surfaces of the power transmitting apparatus 100 and the power receiving apparatus 200, which are in the form of a portable terminal, face each other.

In general, a battery may be mounted through a rear surface of a mobile communication terminal, such as a portable phone or a smart phone, and a display means is provided on a front surface of the mobile communication terminal. In this case, the display means may be damaged due to strong magnetic field.

To prevent this, a shielding film (not illustrated) for shielding the magnetic field may be provided between the battery and the display means, and thus transfer of the magnetic field through the front surface of the terminal may be weakened.

Figure 3:
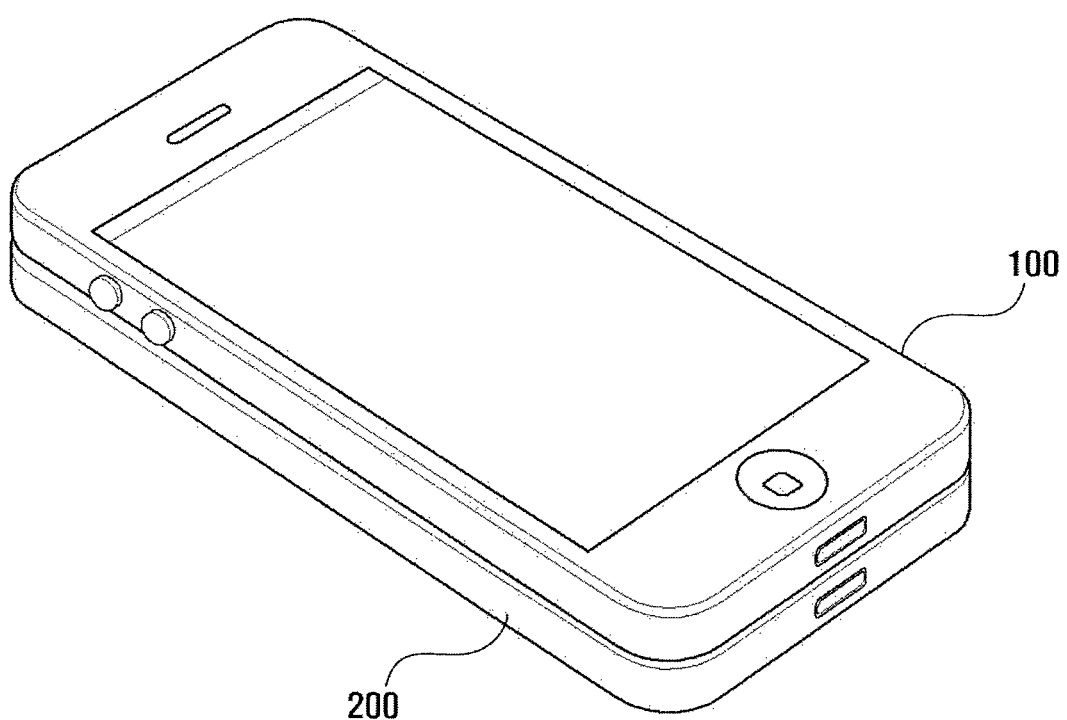
FIG. 3 is a view illustrating that rear surfaces of a power transmitting apparatus and a power receiving apparatus come in contact with each other according to an embodiment of the present invention.

According to an embodiment of the present invention, it is preferable that the power is transmitted and received in a state where the rear surfaces of the power transmitting apparatus 100 and the power receiving apparatus 200 face each other, and as illustrated in FIG. 3, it is preferable that the power is transmitted and received in a state where the rear surfaces of the power transmitting apparatus 100 and the power receiving apparatus 200 come in contact with each other.

Further, as illustrated in FIG. 3, since the rear surfaces of the power transmitting apparatus 100 and the power receiving apparatus 200 come in contact with each other, screens of the respective apparatuses can be directed outward, and through this, a user can confirm the power transfer state.

The power transfer state may be displayed on the screen, and the details thereof will be described later with reference to FIGS. 6 and 7.

Figure 4:
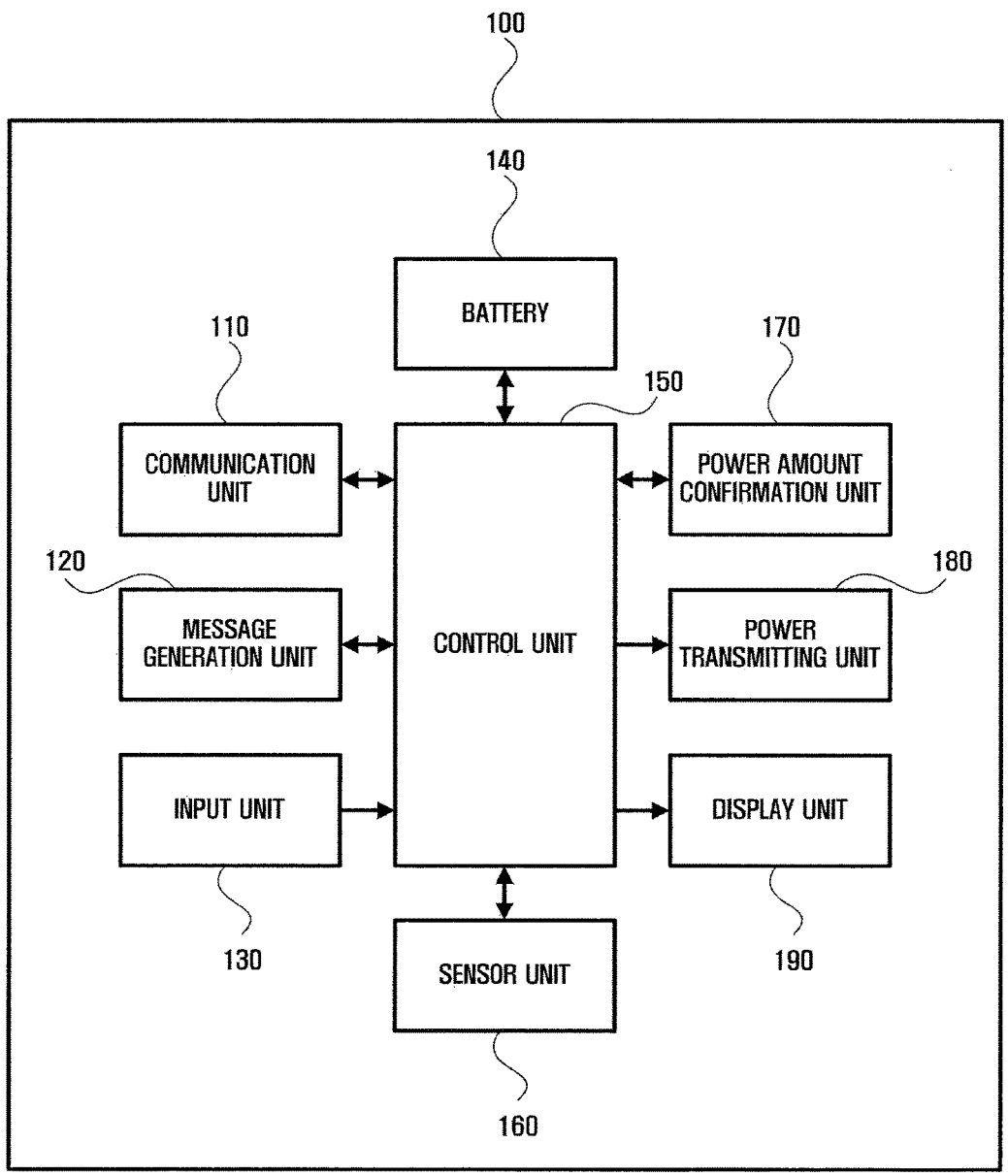
FIG. 4 is a block diagram illustrating the configuration of a power transmitting apparatus according to an embodiment of the present invention.

FIG. 4 is a block diagram illustrating the configuration of a power transmitting apparatus according to an embodiment of the present invention. The power transmitting apparatus 100 is configured to include a communication unit 110, a message generation unit 120, an input unit 130, a battery 140, a control unit 150, a sensor unit 160, a confirmation unit 170, a power transmitting unit 180, and a display unit 190.

The communication unit 110 serves to transmit and receive a message with the power receiving apparatus 200. The communication unit 110 may perform communication with the power receiving apparatus 200 using near field communication, for example, using a communication method, such as infrared communication, Bluetooth, wireless LAN, Wi-Fi (Wireless Fidelity), or Wibro (Wireless Broadband).

However, according to the present invention, it is not necessary to perforin wireless communication between the communication unit 110 and the power receiving apparatus 200, but the communication may also be performed by wire.

The message generation unit 120 serves to generate a message. Since the message has been described in detail, duplicate explanation thereof will be omitted.

The input unit 130 serves to receive an input of a user command. Here, the user command may include an amount of power that is scheduled to be transmitted. That is, a constant value for the base unit as described above is input through the input unit 130, and the base unit may also be input. On the other hand, in the case where the display unit 190 supports a touch screen function, the display unit 190 may perform the function of the input unit 130.

The battery 140 serves to supply the power that is charged therein to circuit components of the power transmitting apparatus 100. Further, the power of the battery 140 that is provided in the power transmitting apparatus 100 is used to be transmitted to the power receiving apparatus 200. The power transmission is performed through the power transmitting unit 180.

The sensor unit 160 serves to determine the posture of the power transmitting apparatus 100. As illustrated in FIG. 3, if the power transmitting apparatus 100 and the power receiving apparatus 200 are put on the ground in a state where the rear surfaces of the apparatuses come in contact with each other, the screen of one of the two apparatuses is exposed to an outside, and the screen of the other of the apparatuses comes in contact with the ground.

In this case, it is preferable that the screen of the apparatus that comes in contact with the ground is turned off since a user is unable to confirm the screen.

For this, the sensor unit 160 may determine the posture of the power transmitting apparatus 100. If the screen is directed upward, the control unit 150 may operate the display unit 190, while if the screen is directed to the ground, the control unit 150 may interrupt the operation of the display unit 190.

The power transmitting unit 180 serves to transmit the power of the provided battery 140 to the power receiving apparatus 200.

It is preferable that the power transmitting unit 180 transmits power using the magnetic field as described above, but is not limited thereto. The power transmitting unit 180 may transmit the power in various manners, for example, wirelessly or by wire.

The confirmation unit 170 serves to confirm at least one of a residual amount of the battery 140, a transmitted amount of the power, an amount of power that is received by the power receiving apparatus 200, a charge amount of the power receiving apparatus 200, and an accumulated time for which the power is being transmitted.

Here, a difference may occur between the transmitted amount of the power and the amount of power that is received by the power receiving apparatus 200 due to a loss that occurs in a transfer process. Particularly, in the case of transmitting and receiving the power wirelessly, the difference may become greater. Accordingly, the amount of power that is received by the power receiving apparatus 200 and the charge amount of the power receiving apparatus 200 may be confirmed through the information message that is received from the power receiving apparatus 200. On the other hand, in the case where the power receiving apparatus 200 is the battery itself, the power transmitting unit 180 and the power receiving apparatus 200 are connected to each other by wire, and thus the amount of power that is received by the power receiving apparatus 200 is equal to the amount of power that is transmitted by the power transmitting unit 180. Accordingly, the amount of power that is received by the power receiving apparatus 200 may be confirmed through this, and the charge amount of the power receiving apparatus 200 may be confirmed through such a direct connection.

However, the power receiving apparatus 200 may be composed of a battery 240 and a power receiving unit 280, and in this case, the power transmitting unit 180 may wirelessly transmit the power to the power receiving unit 280, and the amount of power that is received by the power receiving apparatus 200 and the charge amount of the power receiving apparatus 200 may not be confirmed.

The control unit 150 serves to control transmission of the power through comparison of the result of confirmation by the confirmation unit 170 with a predetermined threshold value. That is, the control unit 150 continually receives the amount of power that is confirmed by the confirmation unit 170 or an accumulated time, and compares the transferred amount of power or the accumulated time with the threshold value.

Here, the threshold value may be a value input by a user, a pre-stored value, or a value received from the power receiving apparatus 200.

The value input by the user means a value that is input through the input unit 130, and the power transmission scheduled value as described above may correspond to this.

The pre-stored value may be a value that is input through the input unit 130 or a value that is set and stored when the apparatus is manufactured, and a storage unit (not illustrated) may be further provided to store this value.

The value that is received from the power receiving apparatus 200 means an amount of power that is requested from the power receiving apparatus 200, and the power reception request value as described above may correspond to this. The power reception request value may be confirmed through the request message that is received from the power receiving apparatus 200.

Further, the control unit 150 performs overall control of the communication unit 110, the message generation unit 120, the input unit 130, the battery 140, the sensor unit 160, the confirmation unit 170, the power transmitting unit 180, and the display unit 190.

The display unit 190 serves to display a power transmission and reception state. For example, the display unit 190 may display at least one of the residual amount of the battery 140, the transmitted amount of the power, the amount of power that is received by the power receiving apparatus 200, the charge amount of the power receiving apparatus 200, the accumulated time for which the power is being transmitted, and the ratio of the confirmed result to the threshold value.

Here, the residual amount of the battery 140, the transmitted amount of the power, the amount of power that is received by the power receiving apparatus 200, the charge amount of the power receiving apparatus 200, and the accumulated time for which the power is being transmitted may be confirmed by the confirmation unit 170.

The ratio of the confirmed result to the threshold value may indicate the degree in which the result that is confirmed by the confirmation unit 170 reaches the threshold value, and may be calculated by the control unit 150.

For example, if the ratio is 60%, this means that the power transmission and reception has proceeded as much as 60 on the assumption that the threshold value is 100. The user can confirm the proceeding situation of the power transmission and reception through this.

Figure 5:
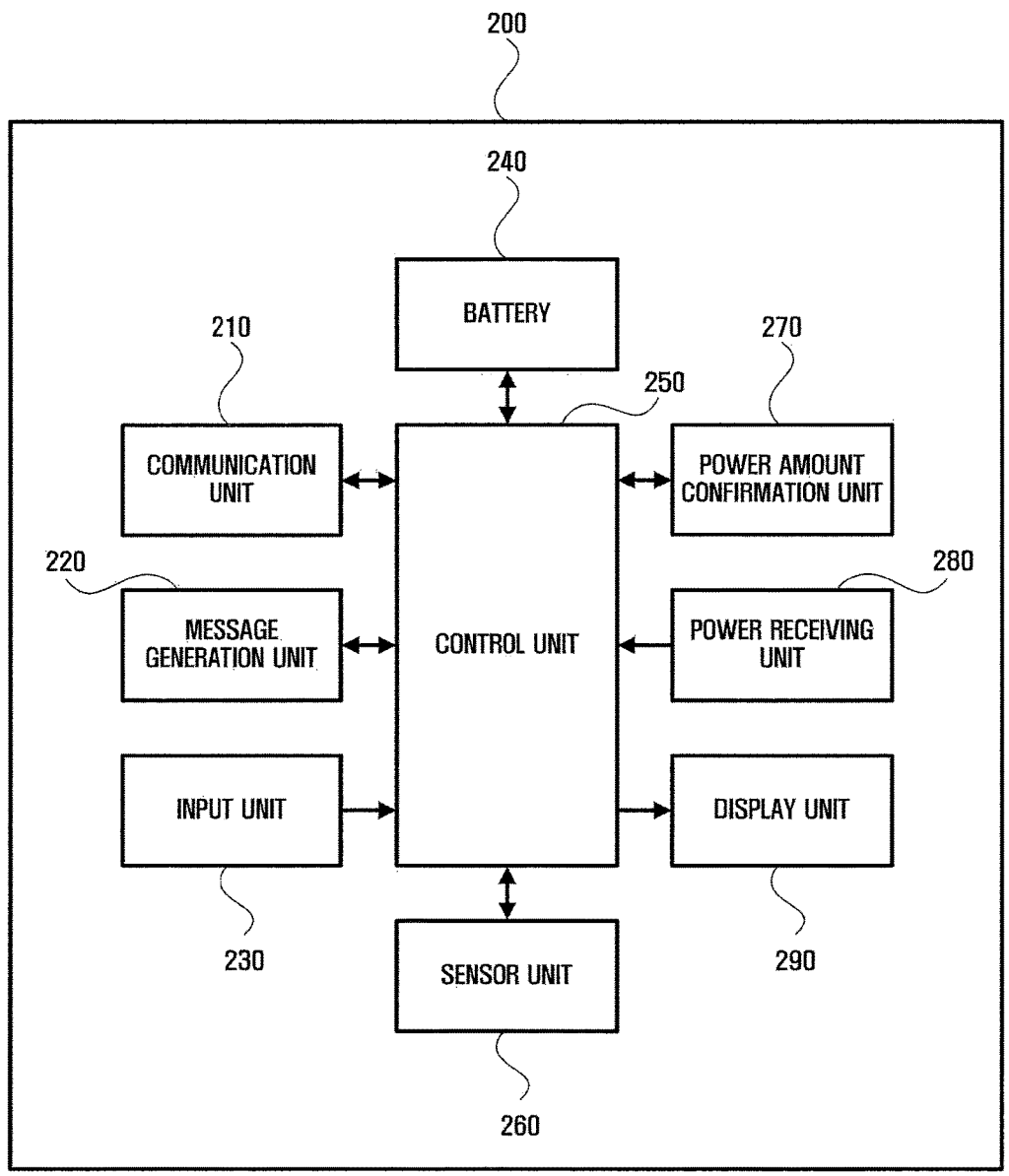
FIG. 5 is a block diagram illustrating the configuration of a power receiving apparatus according to an embodiment of the present invention.

FIG. 5 is a block diagram illustrating the configuration of a power receiving apparatus according to an embodiment of the present invention. The power receiving apparatus 200 is configured to include a communication unit 210, a message generation unit 220, an input unit 230, a battery 240, a control unit 250, a sensor unit 260, a confirmation unit 270, a power receiving unit 280, and a display unit 290.

The communication unit 210 serves to transmit and receive a message with the power transmitting apparatus 100. The communication unit 210 may transmit and receive the message in the same communication method as the communication unit 110 provided in the power transmitting apparatus 100.

The message generation unit 220 serves to generate a message. Since the message has been described in detail, duplicate explanation thereof will be omitted.

The input unit 230 serves to receive an input of a user command. Here, the user command may include an amount of power that is requested. That is, a constant value for the base unit as described above is input through the input unit 230, and the base unit may also be input. On the other hand, in the case where the display unit 290 supports a touch screen function, the display unit 290 may perform the function of the input unit 230.

The battery 240 serves to supply the power that is charged therein to circuit components of the power receiving apparatus 200. Further, the power that is received from the power transmitting apparatus 100 may be charged in the battery 240 that is provided in the power receiving apparatus 200, and thus it is preferable that the battery 240 is a rechargeable battery. For example, a nickel-cadmium (Ni—Cd) battery, an alkaline battery, a nickel-hydrogen (Ni-Mh) battery, a sealed lead acid (SLA) battery, a lithium-ion (Li-ion) battery, or a lithium-polymer (Li-polymer) battery may be used as the battery 240 of the power receiving apparatus 200, but is not limited thereto. The reception of the power is performed through the power receiving unit 280.

The sensor unit 260 serves to determine the posture of the power receiving apparatus 200. Since the function of the sensor unit 260 is similar to the function of the sensor unit 160 that is provided in the power transmitting apparatus 100, the detailed explanation thereof will be omitted.

The power receiving unit 280 serves to receive the power from the power transmitting apparatus 100 and to charge the provided battery 240. In the case where the power transmitting apparatus 100 transmits the power in the form of a magnetic field, the power receiving unit 280 may convert the magnetic field into current using a coil (not illustrated) provided therein and may transfer the current to the battery 240. However, according to the present invention, the type of the power that is transmitted and received is not limited to the magnetic field, but the power can be transmitted and received in various wireless or wired methods as described above.

The confirmation unit 270 serves to confirm at least one of a residual amount of the battery 240, a received amount of the power, an amount of power that is transmitted by the power transmitting apparatus 100, a residual amount of the battery of the power transmitting apparatus 100, and an accumulated time for which the power is being received.

Here, a difference may occur between the received amount of the power and the amount of power that is transmitted by the power transmitting apparatus 100 due to a loss that occurs in a transfer process. Particularly, in the case of transmitting and receiving the power wirelessly, the difference may become greater. Accordingly, the amount of power that is transmitted by the power transmitting apparatus 100 and the residual amount of the battery of the power transmitting apparatus 100 may be confirmed through the information message that is received from the power transmitting apparatus 100. On the other hand, in the case where the power transmitting apparatus 100 is the battery itself, the power receiving unit 280 and the power transmitting apparatus 100 are connected to each other by wire, and thus the amount of power that is transmitted by the power transmitting apparatus 100 is equal to the amount of power that is received by the power receiving unit 280. Accordingly, the amount of power that is transmitted by the power transmitting apparatus 100 may be confirmed through this, and the residual amount of the battery of the power transmitting apparatus 100 may be confirmed through such a direct connection.

However, the power transmitting apparatus 100 may be composed of the battery 140 and the power transmitting unit 180, and in this case, the power receiving unit 280 may wirelessly receive the power from the power transmitting unit 180, and the amount of power that is transmitted by the power transmitting apparatus 100 and the residual amount of the battery of the power transmitting apparatus 100 may not be confirmed.

The control unit 250 serves to control reception of the power through comparison of the result of confirmation by the confirmation unit 270 with a predetermined threshold value. That is, the control unit 250 continually receives the amount of power that is confirmed by the confirmation unit 270 or an accumulated time, and compares the transferred amount of power or the accumulated time with the threshold value.

Here, the threshold value may be a value input by a user, a pre-stored value, or a value received from the power transmitting apparatus 100.

The value input by the user means a value that is input through the input unit 230, and the power reception request value as described above may correspond to this.

The pre-stored value may be a value that is input through the input unit 230 or a value that is set and stored when the apparatus is manufactured, and a storage unit (not illustrated) may be further provided to store this value.

The value that is received from the power transmitting apparatus 100 means an amount of power that is to be transmitted by the power transmitting apparatus 100, and the power transmission scheduled value as described above may correspond to this. The power transmission scheduled value may be confirmed through the request message that is received from the power transmission apparatus 100.

Further, the control unit 250 performs overall control of the communication unit 210, the message generation unit 220, the input unit 230, the battery 240, the sensor unit 260, the confirmation unit 270, the power receiving unit 280, and the display unit 290.

The display unit 290 serves to display a power transmission and reception state. For example, the display unit 290 may display at least one of the residual amount of the battery 240, the received amount of the power, the amount of power that is transmitted by the power transmitting apparatus 100, the residual amount of the battery of the power transmitting apparatus 100, the accumulated time for which the power is being transmitted, and the ratio of the confirmed result to the threshold value.

Here, the residual amount of the battery 240, the received amount of the power, the amount of power that is transmitted by the power transmitting apparatus 100, the residual amount of the battery of the power transmitting apparatus 100, and the accumulated time for which the power is being received may be confirmed by the confirmation unit 270.

The ratio of the confirmed result to the threshold value may indicate the degree in which the result that is confirmed by the confirmation unit 270 reaches the threshold value, and may be calculated by the control unit 250.

For example, if the ratio is 60%, this means that the power transmission and reception has proceeded as much as 60 on the assumption that the threshold value is 100. The user can confirm the proceeding situation of the power transmission and reception through this.

It has been described that constituent elements of the power transmitting apparatus 100 are different from the constituent elements of the power receiving apparatus 200. However, this is merely to discriminate their roles, and in general, it may be understood that the portable terminal that is carried by a user is provided with all functions of the power transmitting apparatus 100 and the power receiving apparatus 200.

That is, the user's portable terminal may serve as the power transmitting apparatus 100, and may also serve as the power receiving apparatus 200.

Further, the power transmitting apparatus 100 and the power receiving apparatus 200 may transmit the request message. However, it is not necessary that both the apparatuses transmit the request message, but it may be understood that if one apparatus transmits the request message, the remaining apparatus does not transmit the request message.

Further, it is not necessary for the information message and the response message to be transmitted and received, and if needed, whether to transmit the request message may be appropriately determined. For example, the power transmitting apparatus 100 can confirm the charge amount of the power receiving apparatus 200 through the information message, and in the case where the user of the power receiving apparatus 200 sets to limit the notification thereof, the information message may not be transmitted.

Figure 6:
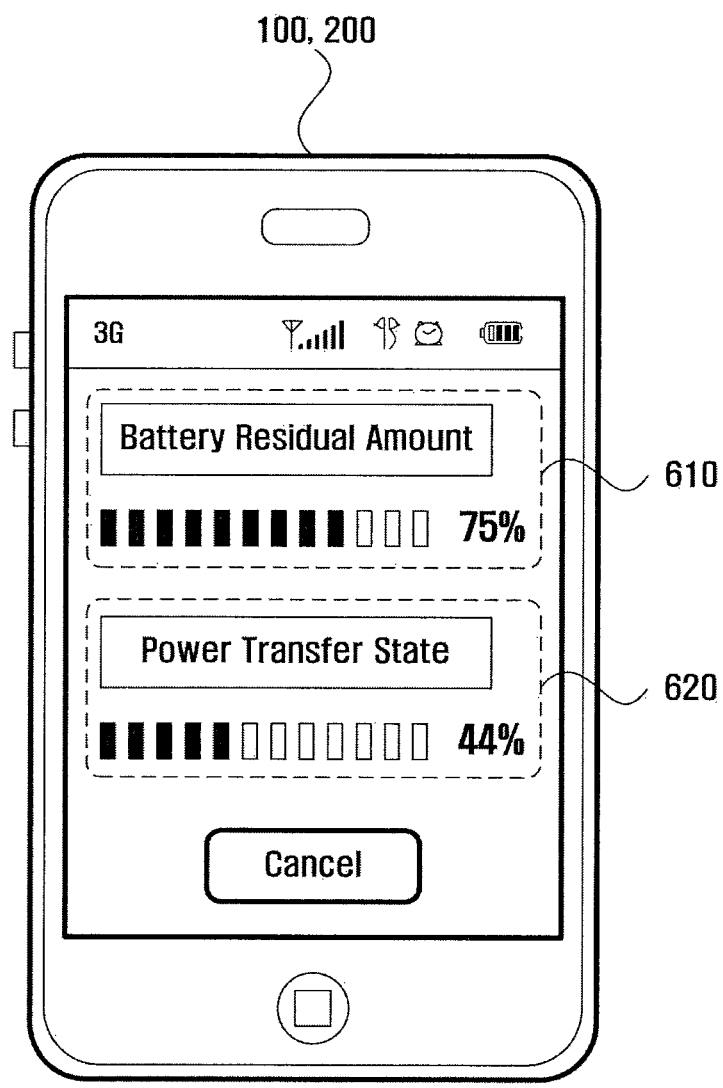
FIG. 6 is a view illustrating that a battery residual amount and a power transfer state are displayed according to an embodiment of the present invention.

FIG. 6 is a view illustrating that a battery residual amount and a power transfer state are displayed according to an embodiment of the present invention. FIG. 6 illustrates that power transmission and reception states 610 and 620 are displayed through the screen of the power transmitting apparatus 100 or the power receiving apparatus 200.

As described above, the power transmitting apparatus 100 can confirm and display the residual amount of the battery provided therein, and the power receiving apparatus 200 can confirm and display the residual amount of the battery of the power transmitting apparatus 100. The residual amount 610 of the battery as illustrated in FIG. 6 may be the residual amount of the battery of the power transmitting apparatus 100.

Further, in FIG. 6, the power transfer state 620 indicates the ratio of the result of confirmation by the confirmation unit 270 to the threshold value as described above, and a user can confirm the power transfer situation through this.

Figure 7:
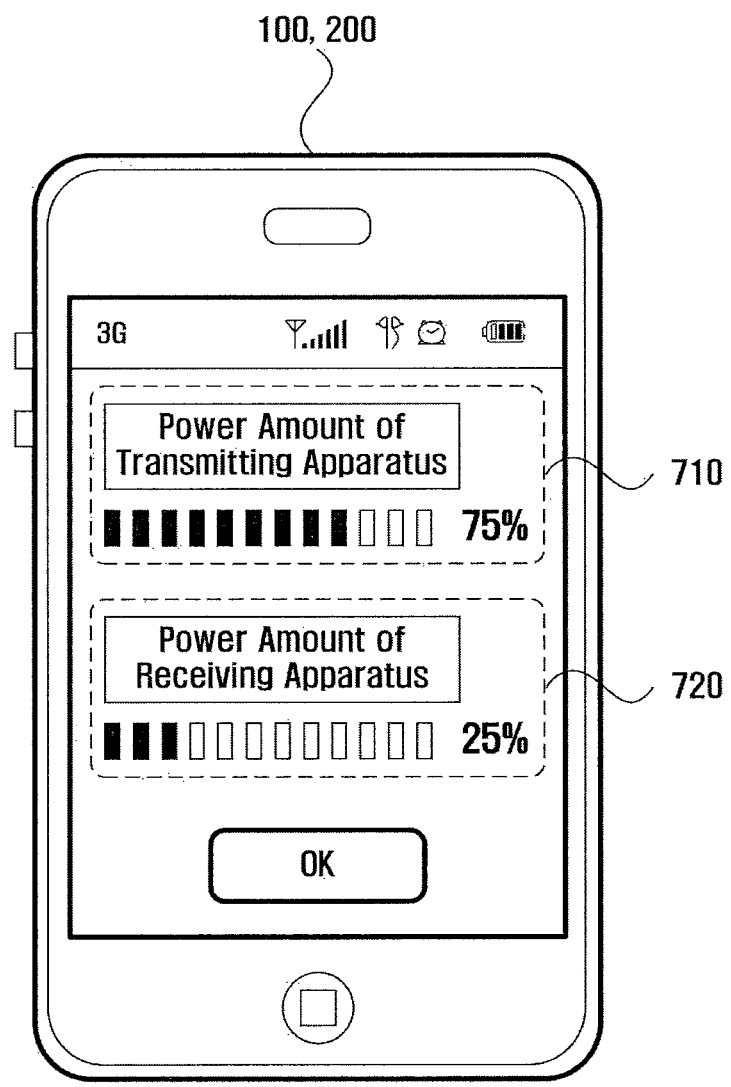
FIG. 7 is a view illustrating that battery residual amounts of a power transmitting apparatus and a power receiving apparatus are displayed according to an embodiment of the present invention.

FIG. 7 is a view illustrating that battery residual amounts of a power transmitting apparatus and a power receiving apparatus are displayed according to an embodiment of the present invention. FIG. 7 illustrates that residual amounts 710 and 720 of batteries of the power the power transmitting apparatus 100 and the power receiving apparatus 200 are displayed through the screen of the power the power transmitting apparatus 100 or the power receiving apparatus 200.

Using this, a user can confirm the residual amounts of the batteries of the respective apparatuses, and can determine whether to continuously proceed with the power transfer in accordance with the result of the confirmation.

On the other hand, although FIGS. 6 and 7 illustrate that the battery residual amounts 610, 710, and 720 of the power transmitting apparatus 100 and the power receiving apparatus 200 and the power transfer state 620 are displayed, the power transmitting apparatus 100 and the power receiving apparatus 200 as described above can display various pieces of information, such as the amount of power that is transmitted or received, and the charge amount that is charged by the power receiving apparatus 200, and the kind of the information being displayed can be determined by the user.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A power transmitting apparatus comprising: a power transmitting unit configured to transmit power of a provided battery to a power receiving apparatus; a confirmation unit configured to confirm an accumulated time for which the power of the provided battery is being transmitted; a control unit configured to control transmission of the power through comparison of the accumulated time with a predetermined threshold value; and a display unit configured to display the accumulated time for which the power is being transmitted, wherein the confirmation unit is further configured to confirm at least one of a residual amount of the battery, a transmitted amount of the power, an amount of power that is received by the power receiving apparatus, and a charge amount of the power receiving apparatus, and wherein the display unit is further configured to display at least one of the residual amount of the battery, the transmitted amount of the power, the amount of the power that is received by the power receiving apparatus, the charge amount of the power receiving apparatus, and a ratio of the result of the confirmation to the threshold value.

2. The power transmitting apparatus of claim 1, wherein the power transmitting unit transmits the power of the battery to the power receiving apparatus by wire or wirelessly.

3. The power transmitting apparatus of claim 1, wherein the threshold value is a value input by a user, a pre-stored value, or a value received from the power receiving apparatus.

4. A power receiving apparatus comprising: a power receiving unit configured to receive power from a power transmitting apparatus and charging a battery provided therein; a confirmation unit configured to confirm an accumulated time for which the power from the power transmitting apparatus is being received; a control unit configured to control reception of the power through comparison of the accumulated time with a predetermined threshold value; and a display unit configured to display the accumulated time for which the power is being received, wherein the confirmation unit is further configured to confirm at least one of a residual amount of the battery, a received amount of the power, an amount of power that is transmitted by the power transmitting apparatus, and a residual amount of a battery of the power transmitting apparatus, and wherein the display unit is further configured to display at least one of the residual amount of the battery, the received amount of the power, the amount of the power that is transmitted by the power transmitting apparatus, the residual amount of the battery of the power transmitting apparatus, and a ratio of the result of the confirmation to the threshold value.

5. The power receiving apparatus of claim 4, wherein the power receiving unit receives the power from the power transmitting apparatus by wire or wirelessly.

6. The power receiving apparatus of claim 4, wherein the threshold value is a value input by a user, a pre-stored value, or a value received from the power transmitting apparatus.

7. A power transmitting method comprising: transmitting power of a provided battery to a power receiving apparatus; confirming an accumulated time for which the power of the provided battery is being transmitted; controlling transmission of the power through comparison of the accumulated time with a predetermined threshold value; and displaying the accumulated time for which the power is being transmitted, confirming at least one of a residual amount of the battery, a transmitted amount of the power, an amount of power that is received by the power receiving apparatus, and a charge amount of the power receiving apparatus; and displaying at least one of the residual amount of the battery, the transmitted amount of the power, the amount of the power that is received by the power receiving apparatus, the charge amount of the power receiving apparatus, and a ratio of the result of the confirmation to the threshold value.

8. The power transmitting method of claim 7, wherein the transmitting the power comprises transmitting the power of the battery to the power receiving apparatus by wire or wirelessly.

9. The power transmitting method of claim 7, wherein the threshold value is a value input by a user, a pre-stored value, or a value received from the power receiving apparatus.

10. A power receiving method comprising: receiving power from a power transmitting apparatus; charging a provided battery with the received power; confirming an accumulated time for which the power from the power transmitting apparatus is being received; controlling reception of the power through comparison of the accumulated time with a predetermined threshold value; displaying the accumulated time for which the power is being received, confirming at least one of a residual amount of the battery, a received amount of the power, an amount of power that is transmitted by the power transmitting apparatus, a residual amount of a battery of the power transmitting apparatus; and displaying at least one of the residual amount of the battery, the received amount of the power, the amount of the power that is transmitted by the power transmitting apparatus, the residual amount of the battery of the power transmitting apparatus, and a ratio of the result of the confirmation to the threshold value.

11. The power receiving method of claim 10, wherein the receiving the power comprises receiving the power from the power transmitting apparatus by wire or wirelessly.

12. The power receiving method of claim 10, wherein the threshold value is a value input by a user, a pre-stored value, or a value received from the power transmitting apparatus.

* * * * *